(12) United States Patent
Feurer

(10) Patent No.: US 6,172,471 B1
(45) Date of Patent: Jan. 9, 2001

(54) BEARING ARRANGEMENT FOR A VIBRATING COMPONENT

(75) Inventor: Georg Feurer, Mörlenbach (DE)

(73) Assignee: Firma Carl Freudenberg, Weinheim (DE)

( * ) Notice: Under 35 U.S.C. 154(b), the term of this patent shall be extended for 0 days.

(21) Appl. No.: 09/400,003

(22) Filed: Sep. 20, 1999

(30) Foreign Application Priority Data

Sep. 18, 1998 (DE) ............................................. 198 42 729

(51) Int. Cl.[7] ............................... H02K 5/24; F16F 15/03
(52) U.S. Cl. ............................................. 318/114; 310/51
(58) Field of Search ............................... 310/51; 318/114

(56) References Cited

U.S. PATENT DOCUMENTS

| | | | |
|---|---|---|---|
| 4,999,534 | * 3/1991 | Andrianos | 310/90.5 |
| 5,049,768 | * 9/1991 | Andersson | 310/51 |
| 5,883,447 | * 3/1999 | Clausin | 310/51 |

* cited by examiner

Primary Examiner—Nestor Ramirez
Assistant Examiner—Judson H. Jones
(74) Attorney, Agent, or Firm—Kenyon & Kenyon

(57) ABSTRACT

A bearing arrangement for a vibrating component having a bearing supported on a carrier for the vibrating component and having a damper which interacts with the carrier and has an inertial mass that is movable relative to the carrier by a damper drive. The damper drive being provided with a drive circuit which includes at least one first sensing element of the vibrating component and a downstream signal generator which generates two harmonic, out-of-phase first signals, whose frequencies correspond to each other and to vibrations of a machine part, as well as a second signal characterizing this frequency. The second signal is supplied to characteristic curve elements whose output signals are multiplied by the first signals of the signal generator, and the third signals obtained in this manner are added up in pairs. The signals obtained in this manner each are multiplied by a fourth signal, generated by a second sensing element, characterizing the relative movements of the carrier. The two fifth signals obtained in this manner each are supplied to a transfer element. The sixth signals obtained in this manner each are multiplied by the first signals of the signal generator. The seventh signals obtained in this manner are added to an eighth signal that is used to operate the damper drive. A frequency response compensation is provided which completely or partially compensates for the amplitude and/or phase changes in the force introduced into the carrier by the inertial mass, in particular due to the change in frequency of the vibration to be compensated.

10 Claims, 2 Drawing Sheets

BEARING ARRANGEMENT FOR A VIBRATING COMPONENT

BACKGROUND OF THE INVENTION

1. Field of the Invention

The present invention relates to a bearing arrangement for a vibrating component having a bearing supported on a carrier for the vibrating component and having a damper which interacts with the carrier and has a inertial mass that can be moved relative to the carrier by a damper drive. The damper drive is with a drive circuit which includes at least one first sensing element for the vibrating component and a downstream signal generator which generates two harmonic, out-of-phase first signals whose frequencies correspond to each other and to the vibration of the machine part, as well as a second signal characterizing this frequency. The second signal is supplied to characteristic curve elements whose output signals are multiplied by the first signals of the signal generator, to generate third signals. The third signals obtained in this manner are added up in pairs, with the signals obtained in this manner each being multiplied by a fourth signal, which is generated by a second sensing element and characterizes the relative movements of the carrier. The resulting fifth signals obtained in this manner are each supplied to a transfer element. Sixth signals obtained in this manner each are multiplied by the first signals of the signal generator to result in seventh signals. The seventh signals obtained in this manner are added to an eighth signal that is used to operate the damper drive.

2. Description of the Related Art

A bearing arrangement for a vibrating component is known from German Patent 43 40 034 C1. In that patent, the active damper assigned to the bearing arrangement makes it possible to compensate for vibrations that occur over a broad range of frequencies. This can be used, for example, to isolate the vibration of a vehicle engine in relation to a vehicle body.

However, the disadvantage of the bearing arrangement known from German Patent 43 40 034 C1 is that the natural frequency of the damper must be less than or equal to the lowest frequency of the vibration to be compensated. In addition, the known bearing arrangement is unable to effectively compensate for vibrations if the frequency of the vibration to be compensated changes quickly.

SUMMARY OF THE INVENTION

The object of the present invention is to provide a bearing arrangement with an expanded operating range which makes it possible to improve the compensation of vibrations, in particular when the frequencies of the vibrations to be compensated change quickly.

In the case of a bearing arrangement of the present invention, this object is achieved by providing a frequency response compensation which either fully or partially compensates for amplitude and/or phase changes in the force introduced by the inertial mass into the carrier, in particular due to changes in the frequency of the vibration to be compensated.

An embodiment of the present invention provides very effective compensation of disturbances even if the frequencies of the vibrations to be compensated change very fast. For example, it is possible to achieve very effective compensation of disturbances in internal combustion engines with high speed variations in speed ranges within which very steep gradients occur in the absolute value and phase of the actuating transfer function. It is also possible to expand the operating range of the active vibration damper if its entire frequency range, including the resonance range of the damper, can be used. Compared to known systems, this considerably reduces power consumption, since the active vibration damper works very efficiently in the resonant frequency range. In addition, it effectively compensates for vibrations in machine parts with pronounced resonances.

According to one advantageous embodiment of the present invention, the transfer elements have controllers designed as PI controllers. PI controllers are controllers which have both a proportional component and an integral component.

Frequency compensation can be carried out especially advantageously by providing the transfer elements with a frequency response compensation circuit.

It is possible to achieve especially effective frequency response compensation by evaluating the second signal for the frequency response compensation.

According to a refinement of the object of the present invention, the second signal is supplied to a time-delay element which generates a ninth signal; and the second signal and the ninth signal are supplied to characteristic curve elements which generate tenth and eleventh signals; and the tenth and eleventh signals are supplied to the transfer elements.

According to an improvement of the drive circuit, the tenth and eleventh signals influence the instantaneous performance of the transfer elements.

It has been proven to be advantageous if the time-delay element has a delay time between 0.1 msec. to 1 sec.

Designing the time-delay element as a shift register of a digital data processing system makes it especially easy to implement the drive circuit of the bearing arrangement according to the present invention.

It is also advantageous if the eighth signal is amplified by a power amplifier.

According to another especially advantageous embodiment of the present invention, the damper drive is composed of a coil which acts upon the inertial mass designed as a magnet.

BRIEF DESCRIPTION OF THE DRAWINGS

The object of the present invention is explained in greater detail below on the basis of the drawings, where.

DETAILED DESCRIPTION OF THE INVENTION

Figure 1:
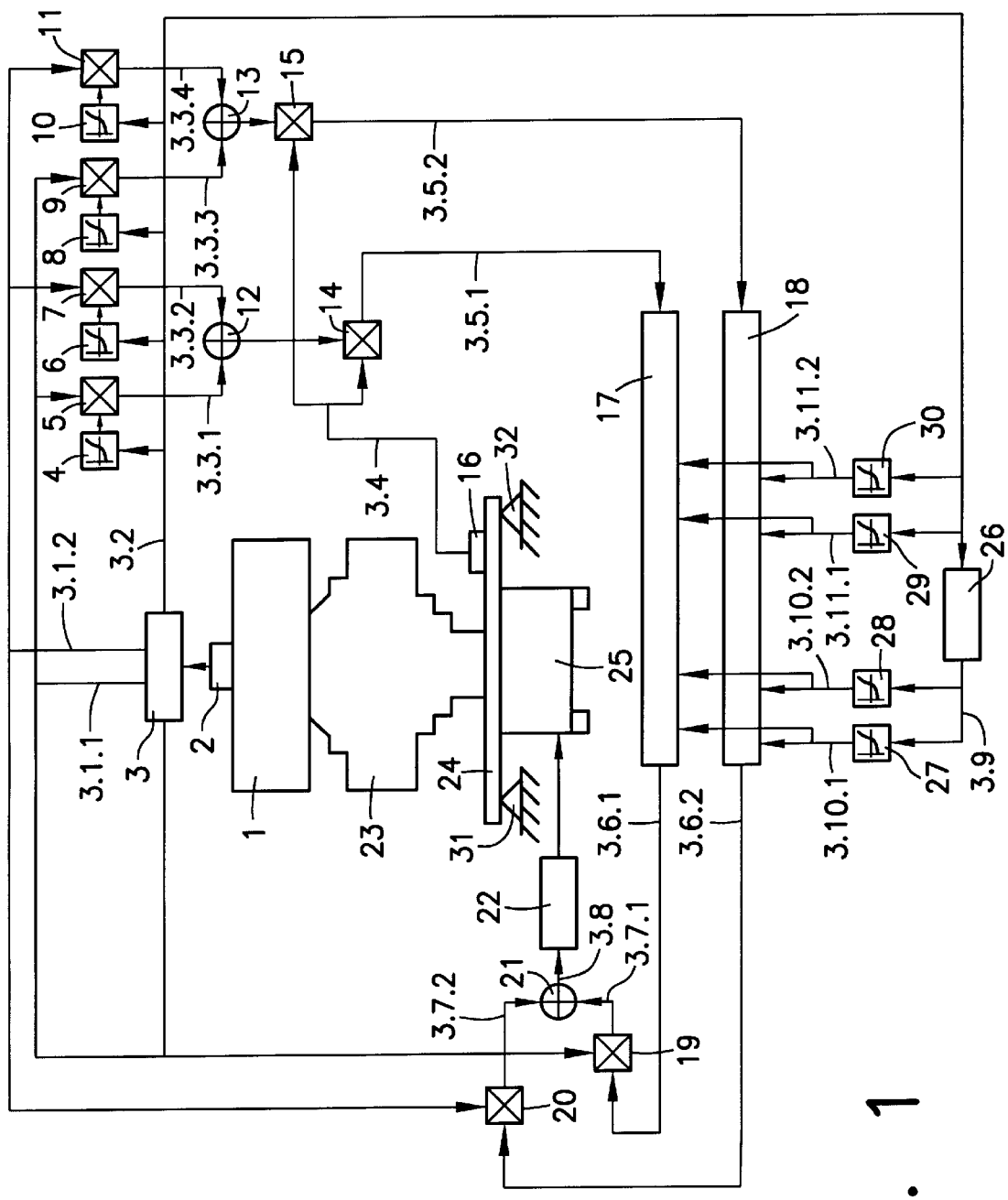
FIG. 1 shows the bearing arrangement according to the present invention with the drive circuit.

FIG. 1 shows a schematic representation of a vibrating component 1 which is supported by a bearing 23 on a carrier 24 located at bearing points 31, 32. An active damper 25 is provided on carrier 24 to absorb the vibrations that occur.

Vibrating component 1 can be, for example, an engine, a gear, an air-conditioning compressor, an electric generator, or even assemblies such as the vehicle wheels. The bearing arrangement according to the present invention can therefore be provided in connection with a wide variety of vibrating components 1. However, vibrating component 1 is preferably an internal combustion engine of a motor vehicle.

Bearing 23 on which vibrating component 1 is supported can be designed as a simple rubber bearing or as a rubber bearing with a hydraulic damping action.

Figure 2:
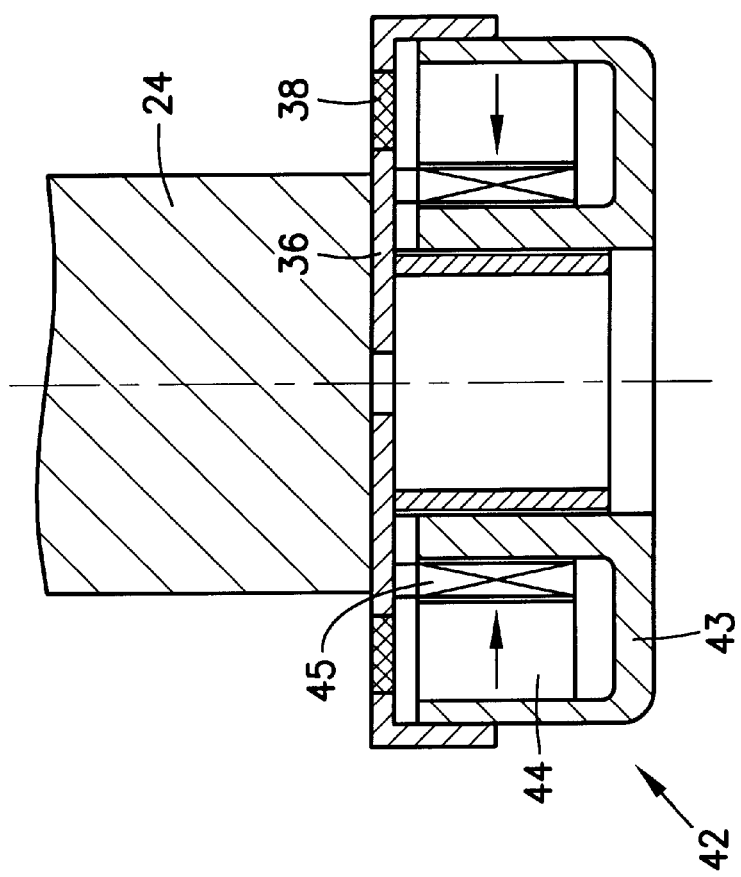
FIG. 2 shows a cross-section of the active vibration damper.

FIG. 2 shows the layout of active vibration damper 25 in greater detail. It has a mounting plate 36 on which an inertial mass 42 in the form of a pot magnet is movably arranged via spring elements 38. The pot magnet includes a solenoid 44 and a solenoid housing 43. The natural frequency of vibration damper 25 can be set to a desired value by changing the mass of pot magnet 42 and/or the spring rate of spring element 38. A plunger coil 45 surrounding pot magnet 42 and permanently connected to mounting plate 26 is provided as damper drive. Plunger coil 45 has a terminal (not shown) through which it can be provided with a drive signal.

The drive circuit illustrated in FIG. 1 is provided for generating the drive signal. It includes a sensing element 2, which provides a periodic time signal whose period is in a fixed proportion to the period of the component vibration to be isolated.

A sensor which emits a constant number of pulses per rotation of a rotating component can be used for this purpose, for example a TDC (top dead center) sensor. This sensor emits a signal when a certain piston of a reciprocating engine reaches top dead center. This produces exactly one pulse per crankshaft rotation. The frequency of an unbalanced harmonic oscillation is therefore in constant proportion to the speed of the reciprocating engine.

The time signal generated by sensing element 2 is forwarded to signal generator 3, which generates from this signal two first signals 3.1.1 and 3.1.2 which are harmonic oscillations with different phase angles. The phase difference between these two harmonic oscillations can also be controlled as a function of frequency. The frequency of these first signals 3.1.1 and 3.1.2 is identical to the frequency of the vibration of component 1 to be isolated.

First signals 3.1.1 and 3.1.2 from signal generator 3 can be represented by the following equations:

$$u_1(t) = \sin(wt)$$

$$u_2(t) = \sin(wt + phi(w))$$

In this equation, w is the angular frequency of the vibration to be isolated.

The following special situations are conceivable:

$$phi(w) = constant = 90°$$

where:

$$u_1(t) = \sin(wt)$$

$$u_2(t) = \sin(wt + 90°) = \cos(wt)$$

or $$u_1(t) = \sin(wt)$$

$$u_2(t) = \sin(wt - wT) = \sin(w(t-T)) = u_1(t-T)$$

where the frequency-dependent phase angle phi is:

$$phi(w) = -w * T$$

and where T is a suitable dead center.

$u_2$ is obtained by delaying $u_1$ by time T. If T is an integer multiple of the sampling interval, then $u_1$ can be very easily shifted in time using a shift register.

Signal generator 3 also generates a second signal 3.2 which characterizes the frequency of the unbalance of unbalanced unit or component 1. A signal of this type can be, for example, directly proportional to the frequency or period of the corresponding vibration.

The components belonging to a signal generator of this type can be:

Phase-locked loop circuits

Tracking filters

Digital oscillators

Output signal $u_1(t)$ (first signal 3.1.1) of signal generator 3 is multiplied by output signal $r_1(t)$ (sixth signal 3.6.1) generated by transfer element 17 using a multiplier 19; output signal $u_2(t)$ (first signal 3.1.2) of signal generator 3 is multiplied by output signal $r_2(t)$ (sixth signal 3.6.2) generated by transfer element 18 using multiplier 20. This yields signals 3.7.1 and 3.7.2.

$$v_1(t) = r_1(t) \cdot u_1(t) = r_1(t) \cdot \sin(wt)$$

$$v_2(t) = r_2(t) \cdot u_2(t) = r_2(t) \cdot \sin(wt + phi(w))$$

i.e., a linear amplitude modulation is carried out, where w is the angular frequency of the unbalance excitation or the frequency of the vibrations of machine part 24.

Signals $v_1$ (seventh signal 3.7.1) and $v_2$ (seventh signal 3.7.2) are added up using an adder 21 and supplied to power amplifier 22. The latter activates the damper drive, thus producing a movement in machine part 24. This movement produced by vibration damper 25 is superimposed on the movement produced, for example, by the unbalance of vibrating component 1. The overall movement of carrier 24 is detected by sensing element 16.

In the discussion below, it is assumed that power amplifier 22, vibration damper 25, machine part 24, and sensing element 2 have a linear response. These interconnected elements are referred to below as the subsystem.

With the linear subsystem in the steady-state condition, the harmonic input signal of power amplifier 22 is:

$$x(t) = r_1(t) \sin(wt) + r_2(t) \sin(wt + phi(w))$$

he output of sensor 16 generates the harmonic output signal:

$$g(t) = r_1(t) abs(G(jw)) \sin(wt + arg(gjw)) + r_2(t) abs(G(jw)) \sin(wt + phi(w) + arg(g(jw)))$$

albeit with a modified amplitude and phase. Here, G(jw) is the actuating transfer function between amplifier input (22) and sensor output (16), while $r_1(t)$ and $r_2(t)$ are amplitudes to be suitably defined.

In addition, a harmonic movement of component 1 at sensing element 16 generates the harmonic signal $$z(t) = Z(t) \sin(wt + gamma(w)).$$

Amplitude Z(t) and phase angle gamma(w) of this signal are influenced by the unbalance forces of vibrating component 1 as well as by the dynamic response.

For the sake of simplicity, the discussion below assumes that only periodic signals occur. This makes it possible to describe the movement, characterized by sensor signal s(t) (fourth signal 3.4), of machine part 24 together with its effect on the signal at power amplifier output x(t) as follows:

$$s(t) = r_1(t) abs(G(jw)) \sin(wt + \arg(G(jw))) +$$
$$r_2(t) abs(G(jw)) \sin(wt + phi(w) + \arg(G(jw))) +$$
$$z(t) \sin(wt + gamma(w))$$

The next step is to adjust amplitudes $r_1(t)$ and $r_2(t)$ so that the movement of machine part 24, characterized by sensor signal s(t), is quickly minimized. In order for this to be successful, the method described here requires that the actuating transfer function of the subsystem be determined in a preliminary trial.

Measured transfer function Gm(jw) between power amplifier input 22 and sensor 16 is divided into absolute value abs(Gm(jw)) and phase arg(Gm(jw)), thus forming the following characteristic curves:

$$a(w) = \frac{1}{\text{abs}(Gm(jw))}\left[\cos(\arg(Gm(jw))) - \frac{\cos(\text{phi}(w))}{\sin(\text{phi}(w))}\sin(\arg(Gm(jw)))\right]$$

$$b(w) = \frac{1}{\text{abs}(Gm(jw))}\frac{\sin(\arg(G(jw)))}{\sin(\text{phi}(w))}$$

$$c(w) = \frac{1}{\text{abs}(Gm(jw))}\cos(\text{phi}(w) + \arg(Gm(jw))) - $$

$$\frac{1}{\text{abs}(G(jw))}\frac{\cos(\text{phi}(w))}{\sin(\text{phi}(w))}\sin(\text{phi}(w) + \arg(Gm)jw))\Big)\Big)$$

$$d(w) = \frac{1}{\text{abs}(Gm(jw))}\frac{\sin(\text{phi}(w) + \arg(G(jw)))}{\sin(\text{phi}(w))}$$

The value range of w is defined by the frequency range of the vibration to be isolated of vibrating component 1.

The frequency of the signal from signal generator 3 characterizing the component vibrations is supplied to characteristic curve elements 4, 6, 8, and 10. The output signals of characteristic curve elements 4, 6, 8, and 10 are identified by a(w), b(w), c(w), and d(w).

Signals $u_1(t)$ and a(w) are supplied to multiplier 5. Multiplier 7 generates the product of $u_2(t)$ and b(w). The two products obtained in this manner (signals 3.3.1 and 3.3.2) are added up using adder 12.

Signal $t_1(t)$ obtained in this manner can be described as follows:

$$t_1(t) = a(w) * u_1(t) + b(w) * u_2(t)$$

$$a(w) * \sin wt + b(w) * \sin(wt + \text{phi})$$

$$\frac{1}{\text{abs}(Gm(jw))}\sin(wt + \arg(Gm(jw)))$$

Signal $t_2(t)$ is generated in the same manner using characteristic curve elements 8 and 10, multipliers 9 and 11, and adder 13.

$$t_2(t) = c(w) * u_1(t) + d(w) * u_2(t)$$

$$c(w) * \sin wt + d(w) * \sin(wt + \text{phi})$$

$$\frac{1}{\text{abs}(Gm(jw))}\sin(wt + \text{phi}(w) + \arg(Gm(jw)))$$

Signal $t_1(t)$ is now multiplied by output signal s(t) (fourth signal 3.4) of sensing element 16, using a multiplier 14. A further multiplier 15 generates the product of $t_2(t)$ and output signal s(t) of sensing element 16.

Taking into account $$\sin(x) * \sin(y) = 0.5(\cos(x-y) - \cos(x+y))$$

$$G(jw) = Gm(jw)$$

this yields:

$$s(t)t_1(t) = r_1(t)0.5(1 - \cos(2wt + 2\arg(G(jw)))) + $$

$$r_2(t)0.5(\cos(\text{phi}(w)) - \cos(2wt + 2\arg(G(jw)) + \text{phi}(w))) + $$

$$\frac{Z(t)0.5}{\text{abs}(g(jw))}[\cos(\text{gamma}(w) - \arg(G(jw))) - $$

$$\cos(2wt + \text{gamma}(w) + \arg(G(jw)))]$$

The following also applies:

$$s(t)t_2(t) = r_1(t)0.5(\cos(-\text{phi}(w)) - \cos(2wt + 2\arg(G(jw)))) + $$

$$r_2(t)0.5(1 - \cos(2wt + 2\arg(G(jw)) + \text{phi}(w))) + $$

$$\frac{Z(t)0.5}{\text{abs}(g(jw))}[\cos(\text{gamma}(w) - \text{phi}(w) - \arg(G(jw))) - $$

$$\cos(2wt + \text{gamma}(w) + \arg(G(jw)))]$$

Signal $s(t) \cdot t_1(t)$ (3.5.1) is supplied to transfer element 17, while signal $s(t) \cdot t_2(t)$ (3.5.2) is supplied to transfer element 18.

Amplitudes $r_1(t)$ and $r_2(t)$ are calculated in these transfer elements 17, 18. It is important that output signals (3.6.1, 3.6.2) of the transfer elements contain only a small amount of signal components having frequency 2w. To achieve this, these signal components can be greatly attenuated in a first step, using low-pass filters. After carrying out a low-pass filtering of this type, known control algorithms can be applied to the signals obtained in this manner. It is also possible to first apply such a control algorithm to $t_1$ and $t_2$ and then carry out low-pass filtering, or use a control algorithm which itself produces the desired low-pass effect. It may be possible to perform the latter function with a controller that has only an integral component.

The functional description continued below assumes that a low-pass filtering function is carried out first, followed by a suitable control algorithm.

The base frequency of the low-pass filter is set so that the harmonic signals having a frequency of 2w are greatly attenuated and can thus be ignored in the further analysis, yet without setting the base frequency too low so that a good dynamic performance of the overall system can be obtained.

Low-pass filtering has very little effect on $r_1(t)$, $r_2(t)$, $Z(t)$ because these are relative slow signals. The effect of the low-pass filtering function is identified below by the use of a prime (').

Low-pass filtering carried out on signals s(t),$t_1(t)$, s(t) $t_2(t)$ yields $$e_1(t) = 0.5\Big(r_1(t)' + r_2(t)'\cos(\text{phi}(w)) + $$

$$\frac{Z(t)'}{\text{abs}(G(jw))}\cos(\text{gamma}(w) - \arg(G(jw)))\Big)$$

$$e_2(t) = 0.5(r_1(t)'\cos(-\text{phi}(w) + r_2')) + $$

$$\frac{Z(t)'}{\text{abs}(G(jw))}\cos(\text{gamma}(w) - \text{phi}(w) - \arg(G(jw)))$$

These equations show that controller input signals $e_1(t)$, $e_2(t)$ are each dependent on $r_1'$ and $r_2'$. The present invention therefore deals with coupled control loops. This coupling does not occur in the case of phi(w)=const=90°.

This coupling is the most pronounced when cos(phi(w)) takes on high values, i.e., when phi(w) is low (or lies in the neighborhood of integer multiples of 180°). A more thorough examination reveals that the coupling terms influence the dynamics of the overall system, at the same time maintaining functionality.

The equations shown above were derived under the condition that measured frequency response $G_m(jw)$ and actual frequency response $(G(jw))$ closely correspond. This condition can be met only through suitable measurements. It is also assumed that transient processes can be ignored. This condition is met in many cases by the fact that the quantities that occur vary continuously, i.e., that abrupt variation do not occur in practice.

A closer examination of the equations described above shows that $e_1$ is directly proportional to $r_1$ and $r_2$ if frequency is constant. The relation between $e_1$ and $r_1$ or $r_2$ is influenced only by angle phi(w). In this context, there is no dependency on frequency response $G(jw)$. The same is true for the relation between $e_2$ and $r_1$ or $r_2$.

The dynamics of the overall system are largely determined by the low-pass filtering step, the control algorithm, and phase difference phi(w). The effect of frequency response $G(jw)$ on the dynamics of the overall system is negligible.

The relationship between signals $e_1$ and $e_2$ and controller outputs $r_1$ and $r_2$ is determined by the control algorithm. PI controllers operating according to $$r_1(t) = k_p * e_1(t) + \frac{kp}{T_1} \int_0^t e_1(t') dt'$$

$$r_2(t) = k_p * e_2(t) + \frac{kp}{T_1} \int_0^t e_2(t') dt'$$

have proven to be useful in practical trials, where $k_p$ is the gain and $T_1$ is the integration time constant of the controller.

The dynamic performance of vibration damper 25, power amplifier 22, sensing element 2, and machine part 24 can be influenced by environmental factors. It is possible to account for these effects by expanding the characteristic curves to form characteristic curve families, with the quantities influencing the dynamic response representing additional input quantities in controlling the characteristic curve family. These additional input quantities are detected with the use of sensors, and the additional input signals thus obtained are supplied to the characteristic families. Signals of this type can be detected, particularly at machine part 24, thus accounting for effects on the dynamic response of this component. The transfer element can have a low-pass response above a randomly defined base frequency, with this base frequency of the frequency of the vibration to be suppressed of component 1 being continuously adjusted.

This further improves the dynamic response of the overall system.

A frequency response compensation which completely or partially compensates for amplitude and/or phase changes in the force introduced into the carrier is also provided.

When the frequency of the vibration to be compensated changes from $w_2$ to $w_1$, the frequency response compensation changes control signals $r_1$ and $r_2$ so that the frequency change relating to amplitude and phase does not affect the amplitude and phase of the force introduced by vibration damper 25 into carrier 24. The frequency of the introduced force oscillation varies according to the change in frequency of the vibration to be compensated.

To ensure optimum frequency response compensation, second signal (3.2) generated by signal generator 3 is supplied to a time-delay element 26, which generates a ninth signal. The second signal is supplied to characteristic curve elements 29, 30, and the ninth signal to characteristic curve elements 27, 28, which generate tenth signals (3.10.1 and 3.10.2) and eleventh signals (3.11.1 and 3.11.2). Delay element 26 can be implemented by a shift register if a digital computer is used. Time period $t_0$ depends on the frequency measured for the vibration of component 1. The tenth signals (3.10.1, 3.10.2) and eleventh signals (3.11.1, 3.11.2) influence the instantaneous response of transfer elements (17, 18).

Characteristic curve response elements 27 through 30 implement frequency-dependent terms $g_0$, $g_1$, $h_0$, and $h_1$ of corresponding actuating transfer function $Gm(jw)$, which, in the case of frequencies $w_0$ and $w_1$, can be represented by the following complex functions:

$$Gm(jw_0) = g_0 + j * h_0$$

$$Gm(jw_1) = g_1 + j * h_1$$

In this case $w_0$ represents the instantaneous frequency and $w_1$ represents the frequency lagging by $T_0$.

The frequency response compensation circuit links the output signals (3.10.1, 3.10.2, 3.11.1, and 3.11.2) of characteristic curve elements 27 through 30 to controller signals $r_1$ and r2 according the following computing rule:

$$\tilde{r}_1(k) = \frac{1}{g_0^2 + h_0^2} \{(g_1 * g_0 + h_1 * h_0) * r_1(k) + (g_1 * h_0 - h_1 * g_0) * r_2(k)\}$$

$$\tilde{r}_2(k) = \frac{1}{g_0^2 + h_0^2} \{(-g_1 * h_0 + h_1 * g_0) * r_1(k) + (g_1 * g_0 + h_1 * h_0) * r_2(k)\}$$

Control by the PI controller and frequency response compensation are both carried out by transfer elements 17 and 18. $\tilde{r}_1(k)$ forms the modified output signal (sixth signal 3.6.1) of transfer element 17, while $\tilde{r}_2(k)$ forms the modified output signal(sixth signal 3.6.2) of transfer element 18.

Controller signals $r_1$ and $r_2$ are assigned to the modified output signals:

$$r_1(k) = \tilde{r}_1(k)$$

$$r_2(k) = \tilde{r}_2(k)$$

This ensures that the frequency response compensation effect remains constant.

The present invention contemplates a number of different variations on the above-described preferred embodiment. It is to be understood that the above description is only of one preferred embodiment, and the scope of the invention is to be measured by the claims below.

What is claimed is:

1. A bearing arrangement for a vibrating component including a bearing supported on a carrier for the vibrating component, comprising:

a damper which interacts with the carrier, the damper including an inertial mass movable relative to the carrier, the damper further including a damper drive for moving the inertial mass;

a drive circuit including at least one first sensing element for the vibrating component and a downstream signal generator, the downstream signal generator which generates two harmonic, out-of-phase first signals whose frequencies correspond to each other and to vibrations of the vibrating component, the downstream signal generator also generating a second signal, the second signal being supplied to characteristic curve elements whose output signals are multiplied by the first signals of the signal generator, thereby creating third signals, the third signals being added up in pairs and the resulting signals being multiplied by a fourth signal generated by a second sensing element to produce two fifth signals, the fourth signal being representative of the relative movements of the carrier, the two fifth signals each being supplied to a transfer element, the transfer elements producing sixth signals, the sixth signals each being multiplied by the first signals of the signal generator to produce seventh signals, the seventh signals being added to an eighth signal used to operate a damper drive, wherein frequency response compensation is provided which completely or partially compensates for changes in the force introduced into the carrier by the vibration damper, in particular due to the change in frequency of the vibration to be compensated.

2. The bearing arrangement according to claim 1, wherein:

the transfer elements have controllers that are PI controllers.

3. The bearing arrangement according to claim 1, wherein:

the transfer elements have a frequency response compensation circuit.

4. The bearing arrangement according to claim 1, wherein:

the second signal is evaluated for frequency response compensation.

5. The bearing arrangement according to claim 4, wherein:

the second signal is supplied to a time delay element which generates a ninth signal, and wherein the second signal and the ninth signal are each supplied to characteristic elements which generate tenth signals and eleventh signals, wherein the tenth and eleventh signals are supplied to the transfer elements.

6. The bearing arrangement according to claim 5, wherein:

the tenth and eleventh signals influence the instantaneous response of the transfer elements.

7. The bearing arrangement according to claim 5, wherein:

the time-delay element has a time delay period between 0.1 ms and 1 sec.

8. The bearing arrangement according claim 5, wherein:

the time-delay element is a shift register of a digital data processing system.

9. The bearing arrangement according to claim 1, wherein:

the eighth signal is amplified by a power amplifier.

10. The bearing arrangement according to claim 1, wherein:

the damper drive of the damper is composed of a coil which acts upon the inertial mass, and wherein the coil is a solenoid.

* * * * *